United States Patent
Park et al.

(10) Patent No.: US 10,337,122 B2
(45) Date of Patent: Jul. 2, 2019

(54) STRETCHABLE CONDUCTIVE NANOFIBERS, STRETCHABLE ELECTRODE USING THE SAME AND METHOD OF PRODUCING THE STRETCHABLE CONDUCTIVE NANOFIBERS

(71) Applicants: SAMSUNG ELECTRONICS CO., LTD., Suwon-si (KR); Industry-Academic Cooperation Foundation, Yonsei University, Seoul (KR)

(72) Inventors: Jong-Jin Park, Hwaseong-si (KR); Jung-kyun Im, Yongin-si (KR); Sang-won Kim, Seoul (KR); Un-yong Jeong, Seoul (KR)

(73) Assignees: SAMSUNG ELECTRONICS CO., LTD., Suwon-si (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 554 days.

(21) Appl. No.: 14/679,112

(22) Filed: Apr. 6, 2015

(65) Prior Publication Data
US 2015/0235731 A1 Aug. 20, 2015

Related U.S. Application Data

(62) Division of application No. 13/571,047, filed on Aug. 9, 2012, now Pat. No. 9,074,304.

(30) Foreign Application Priority Data

Aug. 10, 2011 (KR) .................. 10-2011-0079715

(51) Int. Cl.
*D01D 5/00* (2006.01)
*H01B 1/22* (2006.01)
(Continued)

(52) U.S. Cl.
CPC ............ *D01D 5/0038* (2013.01); *B82Y 30/00* (2013.01); *B82Y 40/00* (2013.01); *D01F 1/09* (2013.01);
(Continued)

(58) Field of Classification Search
CPC ...... B82Y 30/00; B82Y 40/00; D01D 5/0038; D06M 11/83; D01F 1/09; D01F 1/02; Y10T 428/2964; Y10T 442/00
See application file for complete search history.

(56) References Cited

U.S. PATENT DOCUMENTS 6,228,922 B1 * 5/2001 Wang ..................... C08K 3/08
524/413
7,589,141 B2 9/2009 Zalich et al.
(Continued)

FOREIGN PATENT DOCUMENTS

JP 2007191811 A 8/2007
JP 2007-528942 A 10/2007
(Continued)

OTHER PUBLICATIONS

"Effect of nanotube alignment on percolation conductivity in carbon nanotube/polymer compositions"; Du and Fischer; copyright 2005; The American Physical Society.*
(Continued)

*Primary Examiner* — Jennifer A Steele
(74) *Attorney, Agent, or Firm* — Sughrue Mion, PLLC

(57) ABSTRACT

A method of producing stretchable conductive nanofibers includes: providing stretchable nanofibers; providing a metal precursor solution by dissolving metal precursors in a solvent that may swell the stretchable nanofibers; bringing the stretchable nanofibers into contact with the metal precursor solution or its vapor for a sufficient time for the metal precursors to penetrate into the stretchable nanofibers; and reduce the metal precursors inside the stretchable nanofibers to metal nanoparticles.

10 Claims, 10 Drawing Sheets

(51) Int. Cl.
*D06M 11/83* (2006.01)
*B82Y 40/00* (2011.01)
*B82Y 30/00* (2011.01)
*D01F 1/09* (2006.01)

(52) U.S. Cl.
CPC ............... *D06M 11/83* (2013.01); *H01B 1/22* (2013.01); *Y10T 428/2964* (2015.01); *Y10T 442/602* (2015.04)

(56) References Cited

U.S. PATENT DOCUMENTS

| | | |
|---|---|---|
| 2005/0181206 A1 | 8/2005 | Endo et al. |
| 2006/0264140 A1 | 11/2006 | Andrady et al. |
| 2007/0218281 A1 | 9/2007 | Demir et al. |
| 2009/0130301 A1* | 5/2009 | Bahnmuller ......... D01D 5/0061 427/122 |
| 2010/0203315 A1* | 8/2010 | Barrero Ripoll ......... B32B 3/12 428/293.1 |
| 2011/0147673 A1* | 6/2011 | Gaillard ................. D01D 10/02 252/511 |
| 2011/0204297 A1* | 8/2011 | Park ......................... H01B 1/24 252/503 |
| 2012/0003893 A1* | 1/2012 | Branham .............. B32B 15/085 442/332 |
| 2012/0251824 A1* | 10/2012 | Hur ......................... H01B 1/02 428/378 |
| 2012/0279762 A1 | 11/2012 | Hur et al. |
| 2014/0065422 A1* | 3/2014 | Kim ......................... D01F 1/09 428/401 |

FOREIGN PATENT DOCUMENTS

| | | |
|---|---|---|
| JP | 2007-533109 A | 11/2007 |
| KR | 1020050051939 A | 6/2005 |
| KR | 10-2007-0078177 A | 7/2007 |
| KR | 1020090100678 A | 9/2009 |
| KR | 1020100091035 A | 8/2010 |
| KR | 10-2012-0111661 A | 10/2012 |
| KR | 10-2012-0124346 A | 11/2012 |
| WO | 2005021845 A1 | 3/2005 |

OTHER PUBLICATIONS

European Patent Office, Communication dated Oct. 31, 2012 issued in counterpart European Application No. 12180146.8.
Yang, Q.B., et al., "Preparation and Characterization of a Pan Nanofibre Containing AG Nanoparticles Via Electrospinning", Synthetic Metals, Elsevier, vol. 137, Apr. 4, 2003, pp. 973-974.
Communication dated Sep. 29, 2017 by the Korean Intellectual Property Office in counterpart Korean Patent Application No. 10-2011-0079715.

* cited by examiner

STRETCHABLE CONDUCTIVE NANOFIBERS, STRETCHABLE ELECTRODE USING THE SAME AND METHOD OF PRODUCING THE STRETCHABLE CONDUCTIVE NANOFIBERS

CROSS-REFERENCE TO RELATED APPLICATIONS

This application is a divisional of U.S. patent application Ser. No. 13/571,047, filed Aug. 9, 2012, which is based on and claims the benefit of Korean Patent Application No. 10-2011-0079715, filed on Aug. 10, 2011, in the Korean Intellectual Property Office, the disclosure of which is incorporated herein in its entirety by reference. The entire disclosures of the prior applications are considered part of the disclosure of the accompanying divisional application, and are hereby incorporated by reference.

BACKGROUND

1. Field

The present disclosure relates to stretchable conductive composite nanofibers, a stretchable electrode using the same and methods of producing the stretchable conductive nanofibers.

2. Description of the Related Art

Fiber-based electronic devices have many advantages that make them desirable to replace various electronic devices currently available in consumer markets. For example, fiber-based electronic devices are expected to have improved and excellent tensile strength and weavability properties, large surface areas, and variety of surface treatments, and easy formation of composites. Examples of fiber-based electronic devices may include textile solar cells, stretchable transistors, stretchable displays, exterior-stimulated drug delivery, biosensors and gas sensors, light-controlling functional textiles, functional armor clothing, and other functional armor products, etc.

In the field of micro-electronic devices having flexibility and elasticity, it is important to develop electrodes that are stretchable while maintaining conductivity. Materials such as metals have good conductivity, but they are rigid and stiff, and it is difficult to use a metal as it is. When materials such as carbon nanotubes or graphenes are used on their own, it is also difficult to make stretchable electrodes.

Fibrous electrodes as stretchable electrodes and methods of producing a conductive percolation network on the surface of fibers to implement fibrous electrodes have been studied. However, when the conductive percolation network is formed only on the surface of the fibers, there is a limit imposed on a range of strain magnitude where the fibrous electrodes can endure while maintaining conductivity and its percolation network.

SUMMARY

Provided are stretchable conductive nanofibers which have internal conductivity to maintain conductivity under high strain environment and methods of preparing the same.

Provided are stretchable electrodes composed of stretchable conductive nanofibers which have internal conductivity to maintain conductivity during a high strain process.

Additional aspects will be set forth in part in the description which follows and, in part, will be apparent from the description, or may be learned by practice of the presented embodiments.

According to an aspect of the present invention, a stretchable conductive nanofiber includes stretchable nanofibers and a percolation network of conductive nanoparticles formed inside the stretchable nanofibers. According to an embodiment, a stretchable nanofiber containing conductive nanoparticles formed inside the nanofiber which endows the nanofiber with conductivity is sometimes called as "stretchable conductive composite nanofiber" for convenience. Thus, in an exemplary embodiment, a stretchable conductive composite nanofiber includes a stretchable polymeric nanofiber; and conductive nanoparticles formed inside the stretchable polymeric nanofiber, said nanoparticles forming a percolation structure inside the nanofiber. The stretchable conductive composite nanofiber may further contain conductive nanoparticles disposed on a surface of the nanofiber. The stretchable conductive composite nanofiber may form a mat formed of plural nanofibers, and the resulting mat may further contain a percolation structure formed of conductive nanoparticles in a space inside the mat and nanoparticles bound to a surface of individual stretchable composite nanofibers.

According to another aspect of the present invention, a stretchable conductive electrode includes stretchable conductive nanofibers.

According to another aspect of the present invention, a method of producing stretchable conductive nanofibers includes forming stretchable nanofibers; preparing a solution of metal precursors by dissolving metal precursors in a solvent that may swell the stretchable nanofibers; immersing the stretchable nanofibers in the solution of metal precursors to swell the stretchable nanofibers, so the metal precursors may penetrate inside the stretchable nanofibers and disperse; removing and drying the stretchable nanofibers from the solution of metal precursors; and reducing the metal precursors that have penetrated inside the stretchable nanofibers to metal nanoparticles.

In still another aspect, a method of producing the stretchable conductive nanofibers includes providing stretchable nanofibers; providing a metal precursor solution by dissolving metal precursors in a solvent that may swell the stretchable nanofibers; bringing the stretchable nanofibers into contact with the metal precursor solution for a sufficient time for the metal precursors to penetrate into the stretchable nanofibers; and reduce the metal precursors inside the stretchable nanofibers to metal nanoparticles.

BRIEF DESCRIPTION OF THE DRAWINGS

These and/or other aspects will become apparent and more readily appreciated from the following description of the embodiments, taken in conjunction with the accompanying drawings of which:

FIG. 1A and FIG. 1B are perspective views conceptually showing stretchable conductive nanofibers according to an embodiment, wherein FIG. 1B is a cross-sectional view of FIG. 1A;

DETAILED DESCRIPTION

Figure 1A:
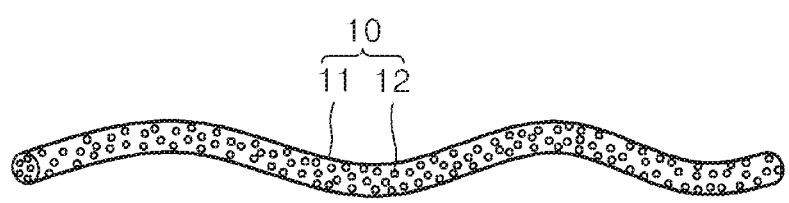

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Figure 1B:
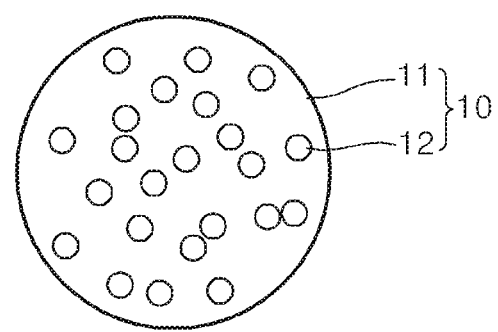

FIG. 1A is a perspective view conceptually showing stretchable conductive nanofibers 10 according to an embodiment, and FIG. 1B is a sectional view of the conductive nanofibers 10. With reference to FIG. 1A and FIG. 1B, the stretchable conductive nanofibers 10 have conductive particles 12 which form a percolation network inside the stretchable nanofibers 11. The percolation network includes a network formed by unit conductive particles or elements arranged and connected to each other in any direction.

The stretchable nanofibers 11 may include, for example, stretchable polymer materials. The stretchable polymer materials may include synthetic rubbers or natural rubbers. Examples of synthetic rubbers may be polybutadiene (PB), poly(styrene-butadiene) (either PS-b-PB (block polymer of PS and PB) or PS-co-PB (copolymer of S and B)), poly(styrene-butadiene-styrene) (PS-b-PB-b-PS) (block copolymer of PS, PB and PS) (sometimes referred to as "SBS"), poly(styrene-ethylene-butylene-styrene) (SEBS), ethylene prolylene diene rubber (EPDM), acrylic rubber, polychloroprene rubber (CR), polyurethane (PU), fluorine rubber or butyl rubber. Examples of natural rubbers may be polyisoprene.

The term "nanofiber" used herein indicates a fiber of a diameter ranging from about 10 nm to about 5.0 μm In an embodiment, the nanofiber may be a synthetic polymeric fiber, which can be prepared by a known method, such as electrospinning, and may have a diameter of about 10 nm-about 5.0 μm. In an embodiment, an electrospun nanofiber may have a diameter from about 100 nm to about 5.0 μm.

The term "stretchable" used herein indicates that a material, e.g., fiber is capable of extended in a direction where an external force is applied. In the application, the word 'stretchable nanofiber(s)" and "stretchable conductive nanofiber(s)" are sometimes simply referred to as "nanofiber(s)" for brevity.

The conductive nanoparticles 12 may include nanoparticles of metal or conductive metal oxide. The metal nanoparticles may include, for example, gold, silver, copper, palladium or platinum. In an embodiment, the total mass of the conductive nanoparticles 12 may be in a range of about 30 to about 70 parts by weight based on total 100 parts by weight of the stretchable conductive nanofibers 10. The conductive nanoparticles 12 may have an average dimension ranging from about 5 to about 100 nm.

Additionally, the conductive nanoparticles 12 may be formed on the surface of the stretchable nanofibers 11. Here, the layer of the conductive nanoparticles 12 on the surface of the stretchable nanofibers 11 may have a thickness in a range of about 5 to about 500 nm. The conductive nanoparticles 12 are dispersed and form a percolation network inside the stretchable nanofiber 11. Thus, when the stretchable nanofibers 11 are strained, an interface fracture of the percolation network in the conductive nanoparticles 12 does not occur, thereby maintaining electric conductivity pathways. Therefore, conductivity is excellent even when the stretchable conductive nanofibers 10 are repeatedly stretched.

The term "mat" used herein indicates a flat piece of a material, e.g., nanofibers, and may be used interchangeably with other similar terms such as "sheet," "film," or "layer." A mat of the stretchable conductive nanofibers 10 may be formed by aggregation of plural nanofibers.

Figure 2:
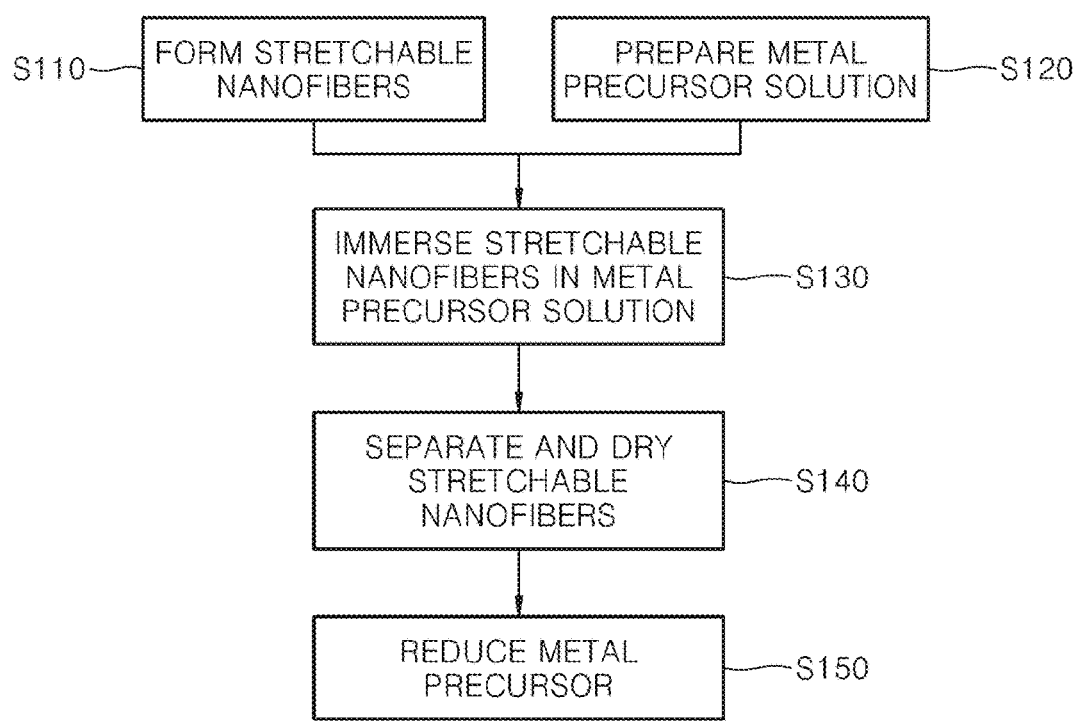
FIG. 2 is a flowchart illustrating a method of producing stretchable conductive nanofibers, according to an embodiment.

FIG. 2 is a flowchart illustrating a method of producing stretchable conductive nanofibers 10, according to an embodiment.

With reference to FIG. 2, stretchable nanofibers 11 are formed (S110). The stretchable nanofibers 11 may be formed by an electrospinning method using stretchable polymer materials. The morphology and diameter of stretchable nanofibers 11 during electrospinning may vary depending on factors such as a molecular weight of a polymer, a type of a solvent, an applied voltage, a spinning distance, a spinning temperature, spinning humidity, and etc. Mechanical, electrical and optical properties of nanofibers may vary depending on intrinsic properties and chemical structures of base materials. One skilled in the art would be able to choose the conditions of electrospining depending on the type of polymeric materials as well as the usage of the resulting conductive nanofibers.

As polymers capable of forming stretchable nanofibers 11, synthetic rubbers such as polybutadiene (PB), poly(styrene-butadiene) (PS-b-PB, PS-co-PB), poly(styrene-butadiene-styrene) (PS-b-PB-b-PS) (SBS), poly(styrene-ethylene-butylene-styrene) (SEBS), ethylene prolylene diene rubber (EPDM), acrylic rubber, polychloroprene rubber (CR), polyurethane (PU), fluorine rubber or butyl rubber and natural rubbers such as polyisoprene may be used. Since the above-mentioned synthetic or natural rubbers have not been cured, the resulting nanofibers may have higher stretchability as compared to cured polymers such as poly(dimethylsiloxane) (PDMS).

As a solvent in which these polymers are dissolved to form a polymer solution having a suitable viscosity, for example, chloroform, chlorobenzene, toluene, dimethylformaldehyde, tetrahydrofuran (THF), dimethyl sulfoxide, N-methylpyrrolidone, or Fluorinert™.

In an embodiment, chloromethane, trifluoractic acid, dimethyl acetamide, dichloromethane, 1,1,1,3,3,3-hexa fluoro-2-propanol (HFIP), acetone, isopropyl alcohol, sulphuric acid, formic acid, water, or a mixture of these solvents may be used.

Methods other than electrospinning, such as wet spinning, conjugated spinning, melt blown spinning or flash spinning may be alternatively used.

A precursor solution of conductive material is prepared (S120). Metal may be used as the conductive material, and for metal precursors, for example, $AgNO_3$, AgCl, $HAuCl_4$, $CuCl_2$, $PtCl_2$ or $PtCl_4$ may be used, but are not limited thereto. Any solvent may be used as long as the metal precursors are dissolved, and the stretchable nanofibers 11 are swelled so the metal precursors may penetrate inside the stretchable nanofibers 11. For example, water, methanol, ethanol, propanol, isopropyl alcohol, butanol, ethylene glycol, dimethylformamide (DMF), tetrahydrofuran (THF) or a mixture of more than two thereof may be used as a solvent. The solution of metal precursors may have a concentration in a range of about 30 to about 70 weight %. Such a solution of metal precursors within this range swells the stretchable nanofibers 11 enough so that the metal precursors may penetrate inside the stretchable nanofibers 11.

The stretchable nanofibers 11 are immersed in the solution of metal precursors (S130). When a mat is formed using the stretchable nanofibers 11, the mat of stretchable nanofibers 11 may be immersed in the solution of metal precursors. When the stretchable nanofibers 11 are immersed in the solution of metal precursors for enough time, they cause the stretchable nanofibers 11 to swell so the metal precursors may penetrate and be dispersed inside the stretchable nanofibers 11. The metal precursors that penetrate and are dispersed inside the nanofibers may become metal seeds forming a nano metal percolation network inside the nanofiber. Also, the metal precursors may not only penetrate inside the stretchable nanofibers 11 but also be deposited on the surfaces of the stretchable nanofibers 11 by immersing the stretchable nanofibers 11 in the solution of metal precursors.

For example, when SBS nanofibers are immersed for enough time in a solution of silver nitrate ($AgNO_3$) in ethanol prepared by dissolving silver nitrate in ethanol, the stretchable nanofibers 11 swell so silver nitrate may penetrate and be dispersed inside the SBS nanofibers, and the silver nitrate may be deposited on the surfaces of the SBS nanofibers 11.

The stretchable nanofibers 11 are removed from the solution of metal precursors and dried (S140). A rinsing process may optionally be performed on the stretchable nanofibers 11 before drying.

Then, the metal precursors inside the stretchable nanofibers 11 are reduced to metal nanoparticles (S150). The reduction of the metal precursors inside the stretchable nanofibers 11 to metal nanoparticles may be performed by treating the stretchable nanofibers 11 with a reducing agent. For example, the stretchable nanofibers 11 having the metal precursors penetrated therein may be exposed to hydrazine ($N_2H_4$) vapor, dropped thereon with concentrated hydrazine, or immersed in a sodium borohydride ($NaBH_4$) ethanol solution, so that the metal precursors inside the stretchable nanofibers 11 may be reduced to metal nanoparticles. Here, the metal precursors on the surface of the stretchable nanofibers 11 may also be reduced to metal. Also, rinsing and drying processes may optionally be performed after treating the stretchable nanofibers 11 with a reducing agent.

Moreover, the metal nanoparticles may be dispersed at a high density by repeating the immersing (S130), drying (S140) and reducing (S150) processes, thereby improving the conductive percolation network of stretchable nanofibers 11.

Furthermore, when forming a mat using stretchable nanofibers 11, a stretchable conductive mat may be formed by the processes described above.

The resulting stretchable conductive nanofibers 10 may be used as fiber-based devices such as wearable displays, wearable solar systems, wearable self powering energy generators, or used in bio health care such as E-skin, artificial muscles, or a wearable electrocardiogram (ECG).

Also, the resulting stretchable conductive nanofibers 10 or the stretchable conductive nanofiber mat may be used as a stretchable electrode.

EXAMPLE 1

(a) Poly (styrene-b-butadiene-b-styrene) (SBS) polymer (Sigma-Aldrich, styrene 21 weight %) was dissolved in a 3:1 (v/v) mixed solution of tetrahydrofuran (THF) and dimethylformamide (DMF) with a 7:3 (SBS 7, solvent 3) weight ratio to prepare a SBS polymer solution. The SBS polymer solution was electrospinned at 20 µl/min of feed rate and 18 kV of applied voltage to produce a SBS nanofiber mat composed of SBS nanofibers.

Figure 3A:
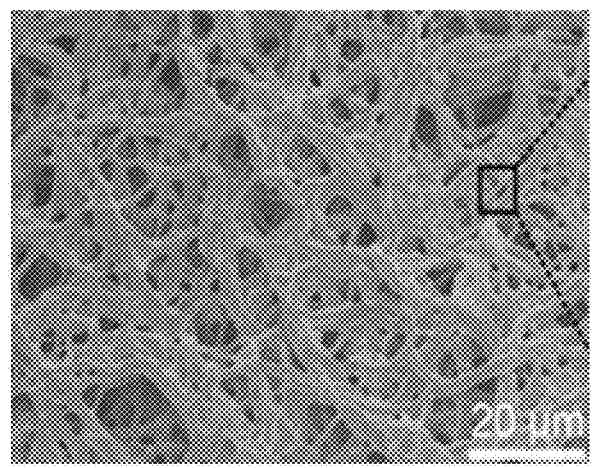
FIG. 3A is a scanning electron microscope (SEM) image showing a poly(styrene-butadiene-styrene) (PS-b-PB-b-PS) (SBS) nanofiber mat formed by electro spinning.
Figure 3B:
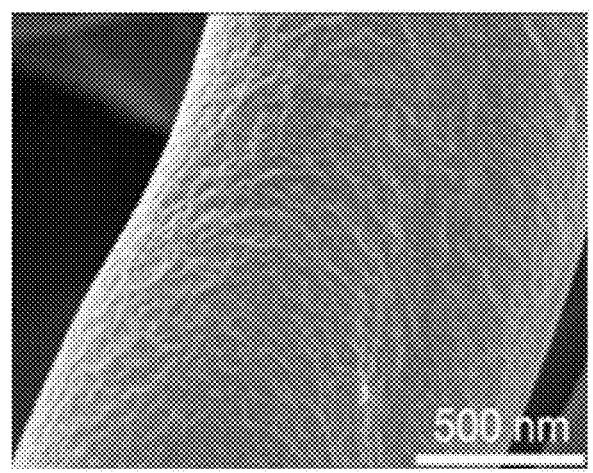
FIG. 3B is an enlarged image of a SBS nanofiber in the mat of FIG. 3A.

FIG. 3A is a scanning electron microscope (SEM) image showing the SBS nanofiber mat formed by electrospinning. As shown in FIG. 3A, SBS nanofibers were aggregated to form a mat. FIG. 3B is an enlarged image of a SBS nanofiber in the selected region of FIG. 3A. In FIG. 3B, it can be seen that the SBS nanofiber has a diameter of about 2.5 µm. The thickness of the resulting SBS nanofiber mat is 200 µm.

(b) Silver trifluoroacetate(STA: $AgCF_3COO$)(Sigma-Aldrich) was dissolved in ethanol with an 8:2 ratio (in weight) to prepare a silver precursor solution.

(c) The SBS nanofiber mat was immersed in the silver trifluoroacetate (STA) solution for 30 minutes. Ethanol dissolves STA as well as swells SBS nanofibers, so STA may be penetrated into SBS nanofibers of the mat. After the immersion, the SBS nanofiber mat was removed from the silver precursor solution and dried at room temperature to remove ethanol from the SBS nanofiber mat. As a result, a SBS nanofiber mat having STA dispersed therein and deposited on the surface thereof was obtained.

Figure 4A:
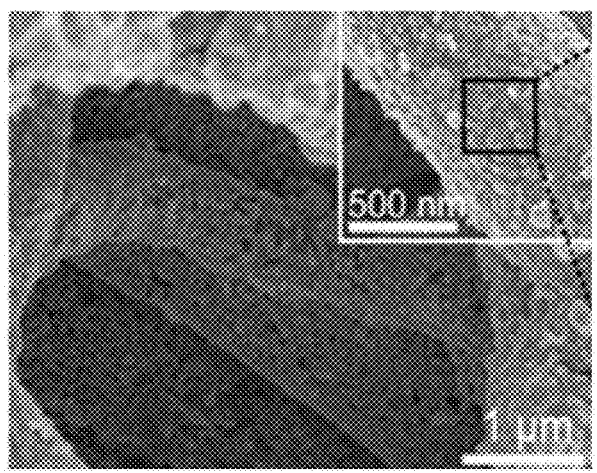
FIG. 4A is a SEM image of a surface of the SBS nanofiber mat after being immersed in the STA solution, removed, and dried.
Figure 4B:
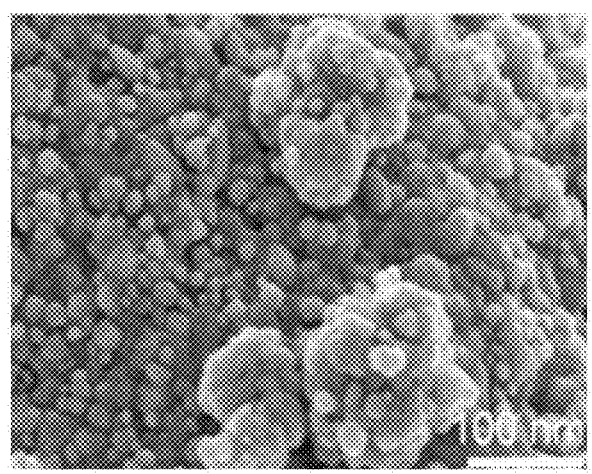
FIG. 4B is an enlarged SEM image of a portion of the surface of FIG. 4A.

FIG. 4A is a SEM image of a surface of the SBS nanofiber mat after being immersed in the STA solution, removed, and dried. FIG. 4B is an enlarged SEM image of a selected region of FIG. 4A. In FIG. 4A and FIG. 4B, it can be seen that STA particles were also formed on the surface of the SBS nanofibers.

(d) Concentrated hydrazine hydrates (($N_2H_4$) (50-60% hydrazine, Sigma-Aldrich)) was dropped on the SBS nanofiber mat removed from a silver precursor solution, and silver trifluoroacetate inside and on the surface of the SBS nanofibers was reduced. After 5 minutes, the SBS nanofiber mat was rinsed with deionized water several times to remove remaining hydrazine hydrates. As a result, a SBS nanofiber mat having silver nanoparticles dispersed therein and deposited on the surface thereof was obtained.

Figure 5A:
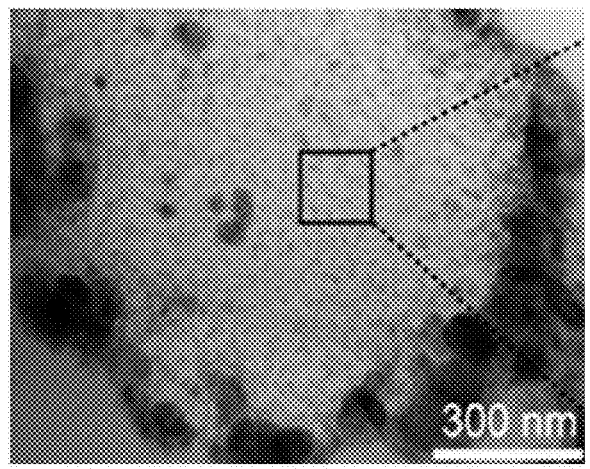
FIG. 5A is a cross section image of SBS nanofibers of a stretchable conductive SBS nanofiber mat.
Figure 5B:
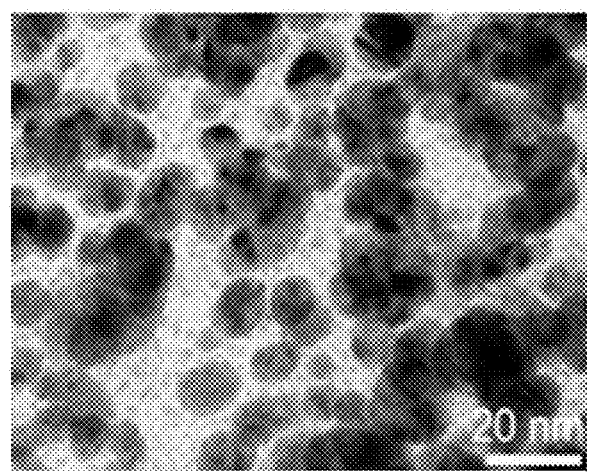
FIG. 5B is an enlarged transmission electron microscopy (TEM) image of a portion of the cross section of FIG. 5A.

FIG. 5A is a cross section image of SBS nanofibers of a stretchable conductive SBS nanofiber mat, and FIG. 5B is a transmission electron microscopy TEM image of a selected region of FIG. 5A. The dark part of the image in FIG. 5B shows silver nanoparticles, and the silver nanoparticles forming a percolation network inside the SBS nanofibers are apparent by their distribution and connection.

Swelling Ratio

Figure 6:
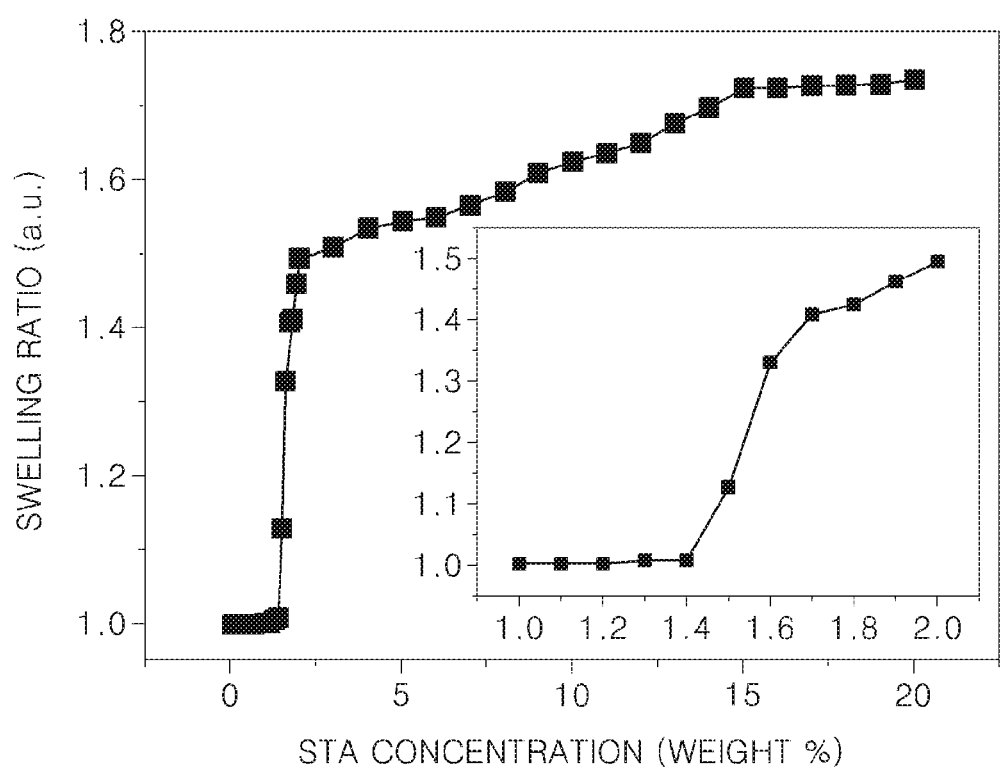
FIG. 6 is a graph showing a swelling ratio of a SBS nanofiber mat immersed in silver trifluoroacetate (STA) solution according to a STA concentration in ethanol.

FIG. 6 is a graph showing a swelling ratio of a SBS nanofiber mat immersed in a STA solution according to an STA concentration in ethanol. The swelling ratio of the SBS nanofiber mat represents the ratio between a length of one side of an electrospinned SBS nanofiber mat and the length of the same side of the SBS nanofiber mat after 30 minutes of immersion in the STA solution.

With reference to FIG. 6, in which the graph shown in a smaller box shows an enlarged curve at concentrations from 1.0 to 2.0 wt % of STA, an increase in the swelling ratio of the SBS nanofiber mat was insignificant or unnoticeable when the weight % of STA was between about 0 and about 1.5, but the swelling ratio of the SBS nanofiber mat increased rapidly to about 1 through about 1.5 when the weight % of STA was between about 1.5 and about 2. The swelling ratio of SBS nanofiber mat at the weight % of STA between about 2 and about 20 increased gradually from about 1.5 to about 1.7. When the weight % of STA in ethanol was 0, the swelling ratio of the SBS nanofiber mat was almost 1. The fact that the swelling ratio of the SBS nanofiber mat increases as the weight % of STA increases shows that the swelling of the SBS nanofiber mat is due to STA. In other words, the swelling of the SBS nanofiber mat of SBS nanofibers occurs when STA penetrates inside of or deposits on the surface of SBS nanofibers.

Fourier Transform Infrared Spectroscopy (FT-IR) Analysis

Figure 7:
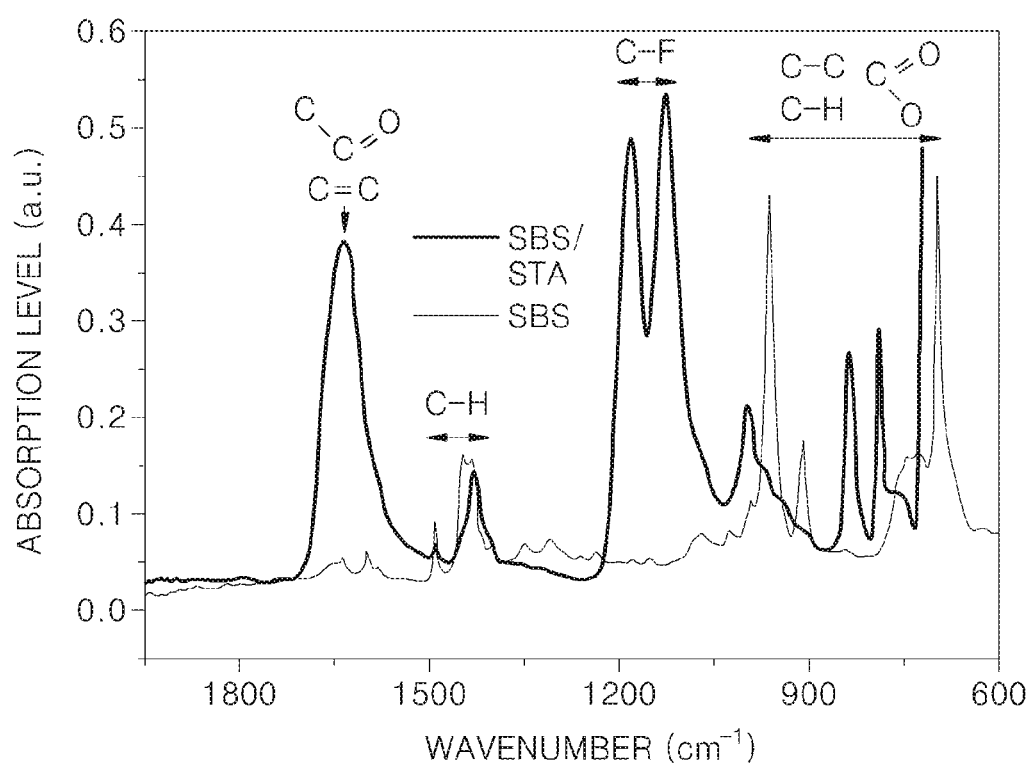
FIG. 7 is a graph showing Fourier Transform Infrared Spectroscopy (FT-IR) analysis of a SBS nanofiber mat immersed in a STA solution.

FIG. 7 is a graph showing FT-IR analysis of a SBS nanofiber mat immersed in a STA solution. The FT-IR analysis was performed after immersing the SBS nanofiber mat in a 15 weight % STA solution, and then removing and drying it. C—F asymmetrical stretching peaks of STA were found at 1128.17 cm$^{-1}$ and 1182.16 cm$^{-1}$, and thus, the STA in SBS was confirmed.

Also, thermogravimetry analysis showed 60 wt % of silver content, and such a high content of silver was possible due to the silver distribution inside the SBS nanofibers besides the silver content on the surface of the SBS nanofibers. It is believed that a high content of silver nanoparticles both on the surface and inside the SBS nanofibers enhances a percolation network of silver nanoparticles both inside and outside the SBS nanofibers. Thus, a conductive SBS nanofiber mat may have high conductivity, and thereby reduce significantly the lowering of conductivity of nanofibers when straining is exerted on the nanofibers.

Strain Test

Figure 8:
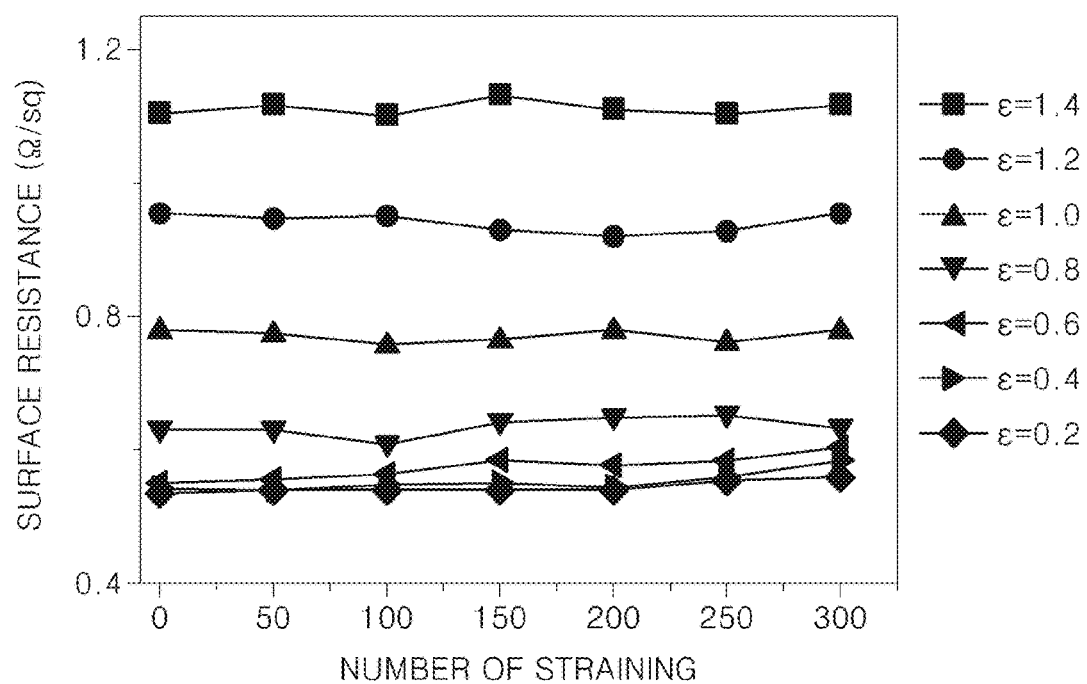
FIG. 8 is a graph showing surface resistance measurements according to the number of strain exerted on a conductive SBS nanofiber mat.

FIG. 8 is a graph showing surface resistance measurements according to the number of straining exerted on conductive SBS nanofiber mat. Straining was exerted up to 300 times, and the surface resistance of the conductive SBS nanofiber mat was measured at a strain ratio from 0.2 to 1.4 with a period of 0.2. When the strain ratio was low, the sheet resistance was also low, but almost no change was made to the sheet resistance according to the number of straining for each strain ratio. This shows that a percolation network of silver nanoparticles inside the SBS nanofiber mat was stably formed.

Figure 9A:
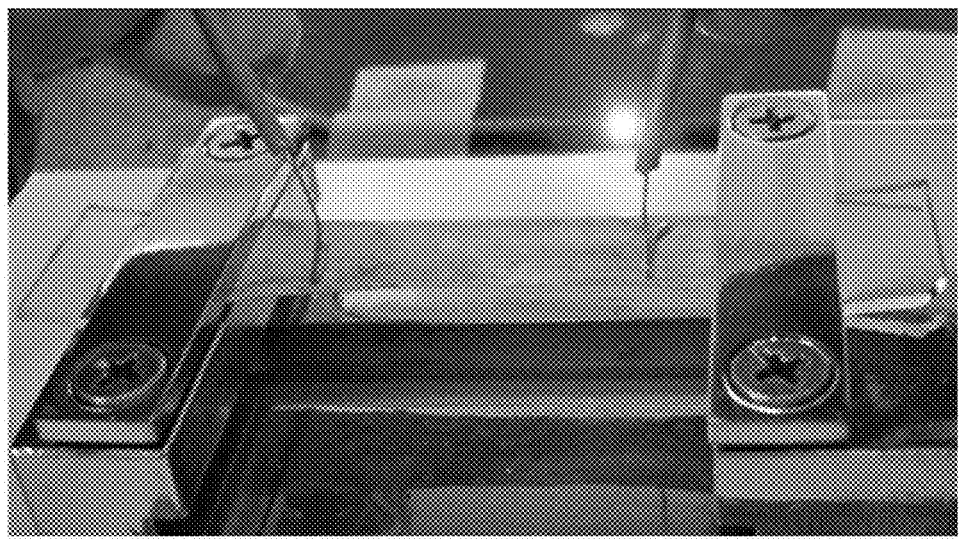
FIG. 9A and FIG. 9B are images showing a circuit connection before and after straining exerted on a SBS nanofiber mat in a light bulb circuit using the SBS nanofiber mat as electrodes.
Figure 9B:
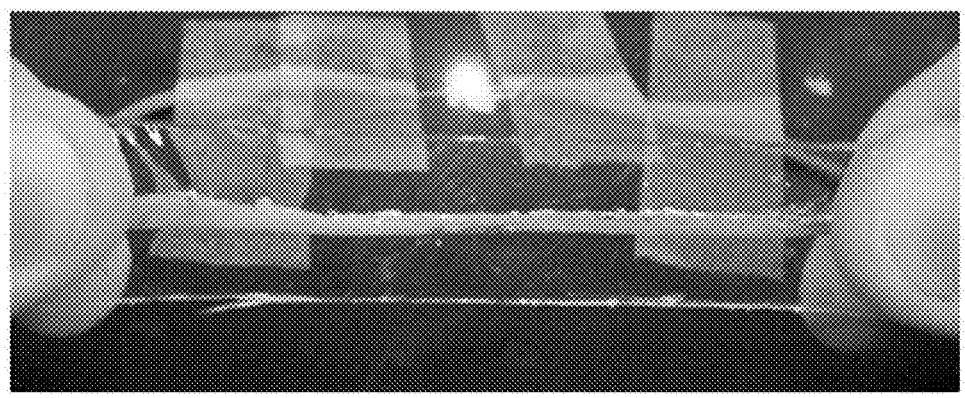

FIG. 9A and FIG. 9B are images showing a circuit connection before and after straining was exerted on the SBS nanofiber mat in a light bulb circuit using the SBS nanofiber mat as an electrode. FIG. 9A is an image of a turned-on light bulb before straining was exerted on the electrode, and FIG. 9B is an image of a turned-on light bulb after 60% strain was exerted on the electrode. From FIG. 9B, it is shown that the conductivity of the SBS nanofiber mat electrode was kept constant at a strain ratio of 0.6.

Figure 10:
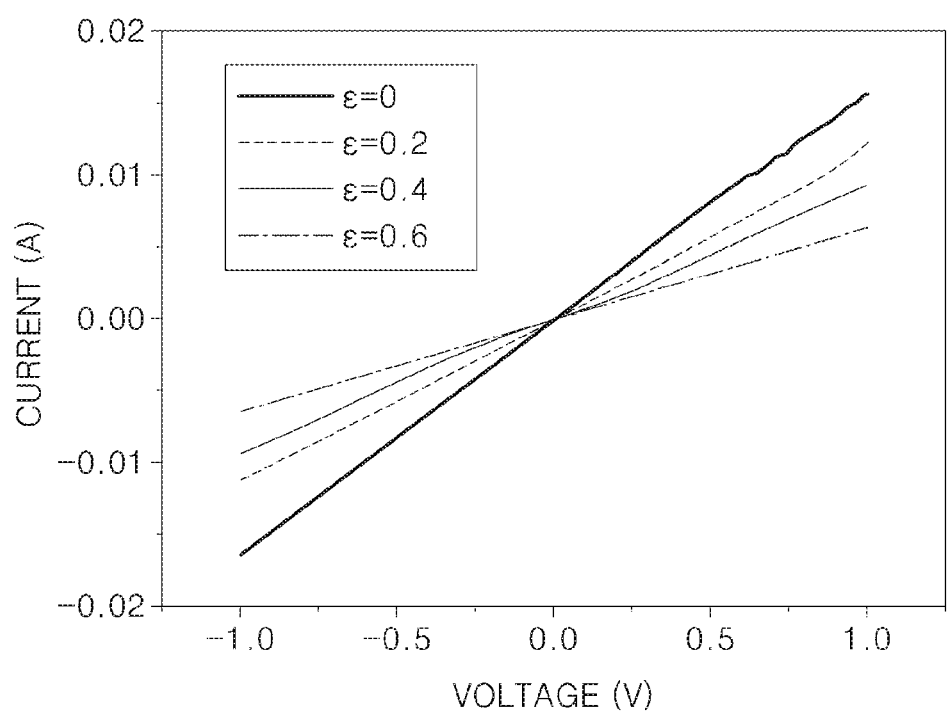
FIG. 10 is a graph showing a current-voltage characteristic according to a strain ratio of a conductive SBS nanofiber mat.

FIG. 10 is a graph showing a current-voltage characteristic according to the strain ratio of the conductive SBS nanofiber mat. The specific resistance of the SBS nanofiber mat according to the strain ratio was obtained from the graph of FIG. 10. The specific resistance of the SBS nanofiber mat was 1.04×10$^{-6}$ Ω·m before straining was exerted, and 1.96×10$^{-6}$ Ω·m at the strain ratio of 0.6 (60% strain) as specific resistance increases when strain ratio increases.

By forming a conductive percolation network inside stretchable nanofibers 11, a strain range while still maintaining conductivity in stretchable nanofibers 11 may be increased.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A mat comprising a plurality of stretchable conductive nanofibers, the plurality of stretchable conductive nanofibers comprising:
   a stretchable nanofiber; and
   a percolation network of conductive nanoparticles, said percolation network of conductive nanoparticles being inside the stretchable nanofiber and the conductive nanoparticles comprising silver, gold, copper, palladium, or platinum,
   wherein a total mass of the conductive nanoparticles is in a range of about 30 to about 70 weight part based on 100 weight part of a total mass of the plurality of stretchable conductive nanofibers, and the average dimension of the conductive nanoparticles is in a range of about 5 to 100 nm, and
   wherein the stretchable nanofiber is formed of an ethylene propylene diene rubber, polychloroprene rubber, fluorine rubber, butyl rubber, polyisoprene, or a mixture thereof.

2. The mat of claim 1, wherein the percolation network of conductive nanoparticles comprises a first percolation network of conductive nanoparticles formed inside the stretchable nanofiber and a second percolation network of conductive nanoparticles on a surface of the stretchable nanofiber.

3. The mat of claim 1, wherein the plurality of stretchable conductive nanofibers further comprise conductive nanoparticles bound to a surface of the stretchable nanofiber.

4. The mat of claim 1, wherein the stretchable nanofiber has a diameter in a range of about 100 nm to about 5.0 μm.

5. A stretchable conductive electrode comprising the mat according to claim 1.

6. The mat of claim 1, wherein the stretchable nanofiber is formed of an ethylene propylene diene rubber.

7. The mat of claim 1, wherein the stretchable nanofiber is formed of a polychloroprene rubber.

8. The mat of claim 1, wherein the stretchable nanofiber is formed of a fluorine rubber.

9. The mat of claim 1, wherein the stretchable nanofiber is formed of a butyl rubber.

10. The mat of claim 1, wherein the stretchable nanofiber is formed of polyisoprene.

* * * * *